No. 753,668. PATENTED MAR. 1, 1904.
J. F. CLARK.
HORSESHOE.
APPLICATION FILED APR. 30, 1903.
NO MODEL.
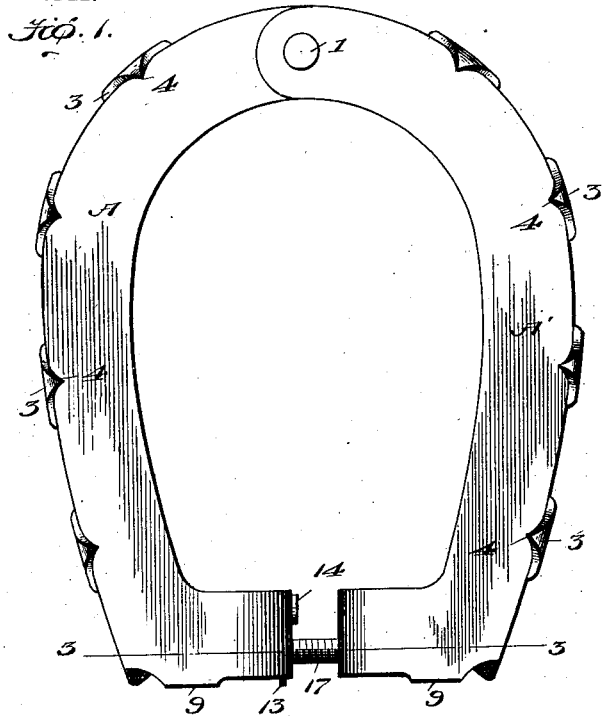
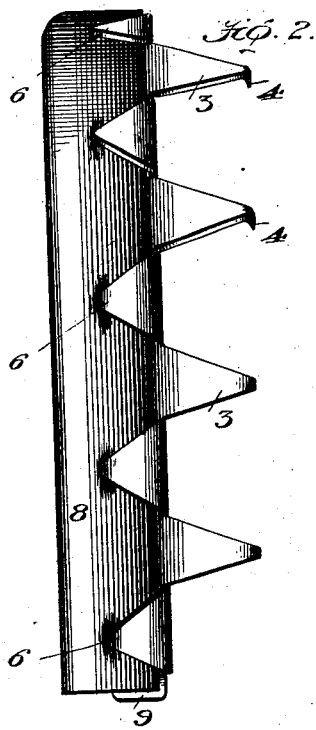
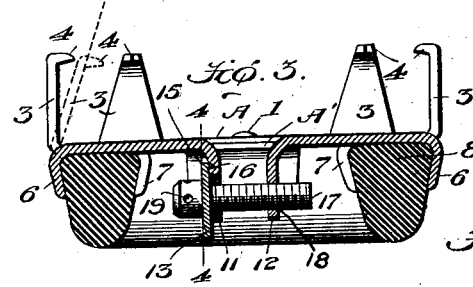
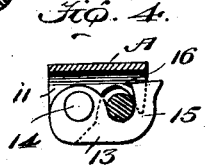
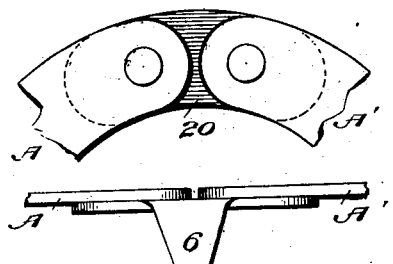
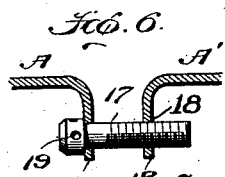
Witnesses
Watts T. Estabrook
Inventor
Jabez Francis Clark
by Amon C. Hodges
his Attorney No. 753,668. Patented March 1, 1904.

UNITED STATES PATENT OFFICE.

JABEZ FRANCIS CLARK, OF DENVER, COLORADO.

HORSESHOE.

SPECIFICATION forming part of Letters Patent No. 753,668, dated March 1, 1904.

Application filed April 30, 1903. Serial No. 155,008. (No model.)

*To all whom it may concern:*

Be it known that I, JABEZ FRANCIS CLARK, a citizen of the United States, and a resident of Denver, in the county of Denver and State of Colorado, have invented a new and useful Improvement in Horseshoes, of which the following is a specification.

My invention relates to an improvement in horseshoes, and more particularly to that variety generally known as "nailless" horseshoes, the object being, as the name implies, to provide a light inexpensive shoe capable of being quickly applied to a horse's hoof without the use of nails or even requiring the services of a blacksmith.

A further object is to provide means for the attachment of any suitable form of tread, whether of rubber or metal.

Still a further object is to provide an adjustable horseshoe adapted to be adjusted to varying sizes of hoofs.

With these objects in view my invention consists in a horseshoe made of two or more pieces of metal, preferably sheet metal, hinged together at the toe, in connection with means for embracing the hoof and for drawing the sections together at the heel to adjust the shoe to the size and shape of and clamp it securely in position on the animal's hoof.

It still further consists in certain novel features of construction and combinations of parts, which will be hereinafter described, and pointed out in the claims.

In the accompanying drawings, Figure 1 is a top plan view of my preferred form of horseshoe. Fig. 2 is a side view. Fig. 3 is a section on line 3 3 of Fig. 1. Fig. 4 is a section on the line 4 4 of Fig. 3, and Figs. 5 and 6 are views of modified constructions.

In the form of horseshoe illustrated in Figs. 1 to 4, A and A' are the two plates comprising the base of the shoe, they being preferably cut or stamped from sheet metal and hinged together at the toe by means of the pin 1. Struck upwardly from the outer edge of these plates are the clamping-spurs 3 3, which normally extend at right angles or approximately at right angles to the main portion of the plates, as shown in Fig. 3, their extreme upper ends terminating in inwardly-projecting teeth 4 4, which are adapted to penetrate the outer surface of the hoof when the shoe is applied to the foot and the clamping-spurs are bent inwardly in their gripping positions, as indicated in dotted lines in Fig. 3. Alternately with these clamping-spurs, preferably, and disposed downwardly are the teeth 6 6, and at suitable intervals on the inner edge of the plates corresponding teeth 7 7 are provided, they being adapted to embrace the tread 8 securely between them from opposite sides. Also teeth at the rear ends, as shown at 9 9, embrace the rear ends of the tread. This tread 8 may be made of rubber, steel, or any suitable material, and it can be removed and replaced, if desired to do so, at any time by bending the teeth outwardly to release their grip upon the tread.

The rear ends of the plates A A' project inwardly toward each other and terminate in downwardly-extending flanges 11 and 12. To one of these flanges a latch 13 is pivoted by means of pin 14, it being provided with a catch 15, which engages the notch 16. In the opening formed by holes in the flange and latch a screw or bolt 17 is swiveled, its threaded end registering with corresponding threads in the hole 18 in the flange 12. The head of the bolt or screw may be round or angular, and when round is provided with holes 19 to receive a pin by which it is turned, and when angular it is adapted to receive a wrench. It will be understood that when the shoe is placed in position on the hoof this screw or bolt is turned to draw the heel ends together, thus forcing the teeth 4 4 of the spurs into the hoof and clamping the shoe securely in place, the spurs being inclined inwardly to conform to the shape of the hoof before or after clamping the shoe in place.

In the modified construction the plates A and A' are hinged to an intermediate plate 20, there being two hinges instead of one, thus allowing the ends of the side plates to meet and bringing them on the same plane and thoroughly balancing the shoe. When this intermediate connecting-plate is used, one of the clamping-spurs 6 is arranged to project downwardly therefrom.

A slight modification in the heel is shown in Fig. 6, the latch being dispensed with and the screw or bolt swiveled in the flange directly instead of between the flange and latch. The latch, however, is preferred, as it affords a quick means of detaching and removing the shoe.

Thus from the foregoing it will be seen that a shoe is provided which may be used on draft or road horses with equally good results. They may be made cheaply and at the same time are durable and withstand the hard usage to which an article of this character is subjected.

Other slight modifications might obviously be made without departing from the spirit and scope of my invention, and hence I do not wish to limit myself to the exact construction herein set forth; but, Having fully described my invention, what I claim as new, and desire to secure by Letters Patent, is—

1. A horseshoe, comprising plates hinged together, provided with clamping-spurs and a bolt or screw for drawing the shoe together at the heel whereby to clamp it securely on the hoof, and a latch pivotally connected with one of the plates for removably holding the bolt or screw in position.

2. A nailless horseshoe comprising hinged plates, alternating upwardly and downwardly projecting spurs independent of each other and carried by the plates, a tread held by the downwardly-projecting spurs, and means for removably clamping the shoe.

3. A nailless horseshoe comprising hinged plates, alternating upwardly and downwardly projecting spurs located on the plates, a tread adapted to be firmly grasped by the downwardly-depending spurs, a latch pivotally secured to one of the plates, a catch on the latch, the plates provided with a notch for the reception of the catch, and means retained in position by the catch for removably securing the shoe on a hoof.

4. The combination with plates hinged together at one end and provided with alternately upwardly and downwardly projecting clamping-spurs and teeth at the outer edge and teeth at the inner edge, of a tread held between said teeth, the rear ends of the plates projecting inwardly and provided with downwardly-projecting lugs and a screw or bolt swiveled in one lug and registering with a threaded hole in the other as a means for drawing the heel ends of the plates toward each other.

5. A nailless horseshoe comprising hinged plates, upwardly and downwardly projecting isolated spurs, a tread engaged by the downwardly-projecting spurs, flanges carried by the plates, one of the flanges being slotted, a latch pivotally secured to the slotted flange and adapted to close the open end thereof, and means passing through the flanges for clamping the shoe on a hoof.

In testimony whereof I have signed this specification in the presence of two subscribing witnesses.

JABEZ FRANCIS CLARK.

Witnesses:
A. F. HAFFEY,
LOGAN RUSSELL.